(12) United States Patent
Chen et al.

(10) Patent No.: US 8,405,013 B2
(45) Date of Patent: Mar. 26, 2013

(54) SOLAR TRACKING DEVICE AND TRACKING METHOD THEREOF

(75) Inventors: Yarn-Chen Chen, Hsinchu (TW); Yi-Chieh Chang, Taichung (TW)

(73) Assignee: Sunplus mMedia Inc., Hsinchu (TW)

( * ) Notice: Subject to any disclaimer, the term of this patent is extended or adjusted under 35 U.S.C. 154(b) by 1258 days.

(21) Appl. No.: 12/192,145

(22) Filed: Aug. 15, 2008

(65) Prior Publication Data

US 2010/0000518 A1    Jan. 7, 2010

(30) Foreign Application Priority Data

Jul. 2, 2008  (TW) ................................ 97124922 A (51) Int. Cl.
*G01C 21/04* (2006.01)
(52) U.S. Cl. ...................... 250/203.1; 126/573; 126/574; 356/139; 356/139.01; 356/139.1; 700/302; 702/94; 702/150; 702/153; 702/154
(58) Field of Classification Search ............... 250/203.4; 356/139, 139.01, 139.1; 126/573–574; 700/302; 702/94, 150, 153–154
See application file for complete search history.

(56) References Cited

U.S. PATENT DOCUMENTS

| 4,297,572 | A |   | 10/1981 | Carlton |           |
|-----------|---|---|---------|---------|-----------|
| 4,305,380 | A |   | 12/1981 | Allen   |           |
| 4,361,758 | A | * | 11/1982 | Rotolo  | 250/203.4 |
| 4,368,962 | A |   | 1/1983  | Hultberg|           |
| 4,445,030 | A |   | 4/1984  | Carlton |           |
| 5,612,679 | A | * | 3/1997  | Burgess | 340/689   |
| 7,252,084 | B2|   | 8/2007  | Pawlenko et al. |   |
| 2003/0169200 | A1 | | 9/2003 | Urban et al. |      |
| 2005/0132799 | A1 | * | 6/2005 | Cooper et al. | 73/509 |
| 2005/0284468 | A1 |   | 12/2005 | Pawlenko et al. | |
| 2009/0320827 | A1 | * | 12/2009 | Thompson et al. | 126/576 |

FOREIGN PATENT DOCUMENTS

| DE | 102006010162 | 9/2007 |
|----|--------------|--------|
| JP | 61-070409    | 5/1986 |
| JP | 05-033013    | 4/1993 |
| JP | 08-014885    | 1/1996 |
| JP | 08-261758    | 10/1996|
| JP | 09-056181    | 2/1997 |
| JP | 2001-217445  | 8/2001 |
| JP | 2002-202817  | 7/2002 |
| JP | 2002-270884  | 9/2002 |
| JP | 2006-080455  | 3/2006 |
| JP | 2007-019331  | 1/2007 |

OTHER PUBLICATIONS

"Office Action of German counterpart application", issued on Feb. 9, 2009, p1-p5.
"Office Action of Japan Counterpart Application", issued on May 11, 2011, p1-p3, in which the listed references were cited.

* cited by examiner

*Primary Examiner* — Georgia Y Epps
*Assistant Examiner* — Kevin Wyatt
(74) *Attorney, Agent, or Firm* — Jianq Chyun IP Office (57) ABSTRACT

A solar tracking device including a solar panel, an orientation control device, and an inclination sensing device is provided. The solar panel is suitable for converting solar energy into electric energy. The orientation control device controls an orientation of the solar panel according to the position and time of the solar panel. The inclination sensing device is disposed on the solar panel for detecting an inclination direction of the solar panel. The inclination sensing device is suitable for outputting a feedback signal to the orientation control device to adjust the orientation of the solar panel. The solar tracking device has a simple tracking mechanism because of a simple feedback mechanism of the inclination sensing device.

22 Claims, 6 Drawing Sheets

SOLAR TRACKING DEVICE AND TRACKING METHOD THEREOF

CROSS-REFERENCE TO RELATED APPLICATION

This application claims the priority benefit of Taiwan application serial no. 97124922, filed on Jul. 2, 2008. The entirety of the above-mentioned patent application is hereby incorporated by reference herein and made a part of specification.

BACKGROUND OF THE INVENTION

1. Field of the Invention

The present invention generally relates to a tracking device, and more particularly, to a solar tracking device.

2. Description of Related Art

The sun provides a virtually unlimited and pollution-free supply of solar energy, and along with the increasing concern regarding pollution and power shortage, solar energy has become the focus among all power sources. A solar panel can convert solar energy directly into electric energy because it is disposed with a photovoltaic cell (PV cell). However, how to increase the photoelectric conversion efficiency of a solar panel is one of today's major subjects.

Generally speaking, compared to a solar panel facing a fixed direction, the photoelectric conversion efficiency of a solar panel which faces the sun all the time is greatly increased by 25%~40%. However, every day the sun moves from east to west due to the axial rotation of the earth, and because there is a 23.5° inclination between the rotation axis of the earth and the revolving orbit thereof around the sun, the yearly movement of the sun is meridional. In other words, a solar tracking device having more than one axis has to be adopted in order to allow a solar panel to face the sun more effectively and to achieve a higher photoelectric conversion efficiency.

A control motor or an equivalent control unit is usually adopted in an existing solar tracking device for controlling the movement of a solar panel. In order to allow a solar panel to face the sun correctly, photo sensors are usually disposed in a conventional solar tracking device for detecting the maximum solar radiation intensity of the sun at all the time, such that the movement of the solar panel can be adjusted in real time to orient the solar panel towards the sun.

However, because a conventional solar tracking device is usually disposed with multiple photo sensors, the operation mechanism thereof is very complicated and the fabricating cost thereof is very high.

SUMMARY OF THE INVENTION

Accordingly, the present invention is directed to a solar tracking device which has a simple tracking mechanism and low fabricating cost.

The present invention is also directed to a solar tracking device which also has a simple tracking mechanism and low fabricating cost.

The present invention is further directed to a solar tracking method which allows a solar panel to face the sun constantly and effectively and accordingly increases the photoelectric conversion efficiency of the solar panel.

The present invention provides a solar tracking device including a solar panel, an orientation control device, and an inclination sensing device. The solar panel is suitable for converting solar energy into electric energy. The orientation control device controls an orientation of the solar panel according to the position and time of the solar panel. The inclination sensing device is disposed on the solar panel for detecting an inclination direction of the solar panel. The inclination sensing device is suitable for outputting a feedback signal to the orientation control device to adjust the orientation of the solar panel.

The present invention also provides a solar tracking device including a casing, a plurality of solar panels, an orientation control device, and a plurality of inclination sensing devices. The solar panels are disposed in the casing and are suitable for converting solar energy into electric energy. The orientation control device respectively controls a first orientation of each of the solar panels according to the position and time of the solar panel. The inclination sensing devices are respectively disposed on the solar panels for respectively detecting a first inclination direction of each of the solar panels. The inclination sensing devices are suitable for respectively outputting a first feedback signal to the orientation control device to respectively adjust the first orientation of each of the solar panels.

According to an embodiment of the present invention, the inclination sensing device includes a first containing area extended along a first direction and a first moving element disposed within the first containing area. A first sensing element is disposed within the first containing area. The first sensing element senses a first moving position of the first moving element to detect a first inclination angle of the solar panel along the first direction. The first moving element moves along the first direction.

According to an embodiment of the present invention, a plurality of first sensing elements are disposed within the first containing area.

According to an embodiment of the present invention, the inclination sensing device further includes a second containing area extended along a second direction and a second moving element disposed within the second containing area. A plurality of second sensing elements are disposed within the second containing area. The second sensing elements sense a second moving position of the second moving element to detect a second inclination angle of the solar panel along the second direction. The second moving element moves along the second direction.

According to an embodiment of the present invention, the inclination sensing device outputs the feedback signal or the first feedback signal to the orientation control device according to the first inclination angle and/or the second inclination angle to adjust the orientation of the solar panel.

According to an embodiment of the present invention, the first direction is a direction from east to west or a direction from west to east.

According to an embodiment of the present invention, the second direction is a direction from south to north or a direction from north to south.

According to an embodiment of the present invention, the orientation control device includes a real time clock (RTC), a microcontroller unit (MCU), a memory storage unit, a motor control unit, and an input/output (I/O) unit. The RTC is suitable for generating a time signal where the solar panel is. The MCU generates a control sequence signal according to a position signal and the time signal of the solar panel. The memory storage unit stores the position signal, the time signal, and the control sequence signal. The motor control unit is suitable for receiving the control sequence signal to control the orientation of the solar panel. The I/O unit is suitable for transmitting the feedback signal or the first feedback signal of the inclination sensing device to the orientation control device to adjust the orientation of the solar panel.

According to an embodiment of the present invention, the position signal includes one of a longitude signal, a latitude signal, and an altitude signal or a combination thereof.

According to an embodiment of the present invention, the orientation control device further includes a data transmission device. The data transmission device is suitable for loading the position signal into the orientation control device.

According to an embodiment of the present invention, the data transmission device is a serial port device or a parallel port device.

According to an embodiment of the present invention, the orientation control device further includes a signal receiver for correcting or fine tuning the time signal of the RTC.

According to an embodiment of the present invention, the orientation control device further controls a second orientation of the casing according to the position and time of the solar panel.

According to an embodiment of the present invention, one of the inclination sensing devices is further disposed on the casing to detect a second inclination direction of the casing, wherein the inclination sensing device is suitable for outputting a second feedback signal to the orientation control device to adjust the second orientation of the casing.

The present invention further provides a solar tracking method which is suitable for controlling an orientation of a solar panel. The solar tracking method includes following steps. First, a position signal and a time signal of the solar panel are obtained. Then, a control sequence signal is generated according to the time signal and the position signal. Next, the orientation of the solar panel is controlled according to the control sequence signal. After that, an inclination direction of the solar panel is detected. Thereafter, a feedback signal is output according to the inclination direction to adjust the orientation of the solar panel.

According to an embodiment of the present invention, the method for detecting the inclination direction of the solar panel includes detecting a first inclination angle of the solar panel along a first direction, wherein the first direction is a direction from east to west or a direction from west to east.

According to an embodiment of the present invention, the method for detecting the inclination direction of the solar panel further includes detecting a second inclination angle of the solar panel along a second direction, wherein the second direction is a direction from south to north or a direction from north to south.

According to an embodiment of the present invention, the solar tracking method further includes outputting the feedback signal according to the first inclination angle and/or the second inclination angle to adjust the orientation of the solar panel.

According to an embodiment of the present invention, the method for obtaining the position signal includes providing a data transmission device, wherein the data transmission device is suitable for transmitting the position signal. The position signal includes one of a longitude signal, a latitude signal, and an altitude signal, or a combination thereof.

According to an embodiment of the present invention, the method for obtaining the time signal includes providing a RTC, wherein the RTC is suitable for generating the time signal where the solar panel is.

In a solar tracking device provided by the present invention, an orientation control device controls the orientation of a solar panel according to the position and time of the solar panel. Besides, an inclination direction of the solar panel is detected by an inclination sensing device disposed on the solar panel to determine whether the solar panel faces the sun correctly and adjust the orientation of the solar panel accordingly. In short, the solar tracking device in the present invention offers a simple tracking mechanism, low fabricating cost, and high photoelectric conversion efficiency.

In order to the make the aforementioned and other objects, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
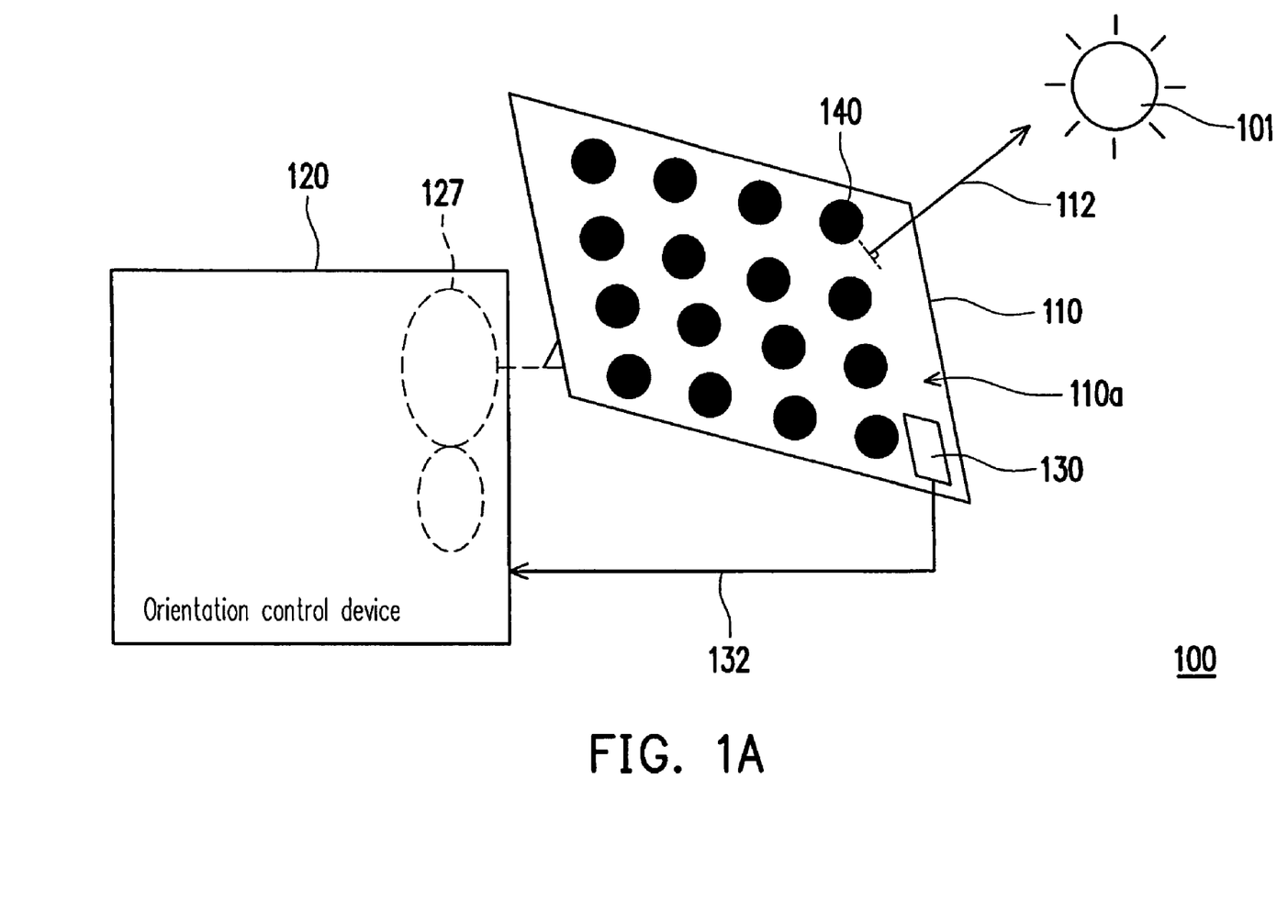
FIG. 1A is a diagram of a solar tracking device according to an embodiment of the present invention.

FIG. 1A is a diagram of a solar tracking device according to an embodiment of the present invention. Referring to FIG. 1A, in the present embodiment, the solar tracking device 100 includes a solar panel 110, an orientation control device 120, and an inclination sensing device 130. The solar panel 110 is suitable for converting solar energy into electric energy. The orientation control device 120 controls an orientation 112 of the solar panel 110 according to the position and time of the solar panel 110, wherein the orientation 112 is defined as the normal vector of a light receiving surface 110a of the solar panel 110 which faces the sun 101. The inclination sensing device 130 is disposed on the solar panel 110 for detecting an inclination direction (not shown) of the solar panel 110, wherein the inclination direction is defined as the current normal vector of the light receiving surface 110a of the solar panel 110. The inclination sensing device 130 is suitable for outputting a feedback signal 132 to the orientation control device 120 according to the inclination direction to adjust the orientation 112 of the solar panel 110.

It should be noted herein that even though the orientation control device 120 directly controls the solar panel 110 to face the solar panel 110 towards the sun 101 according to the current position and time of the solar panel 110, the solar panel 110 may not face the sun 101 directly because of any error caused by mechanical operations or environmental interruptions. In this case, the inclination sensing device 130 detects the current inclination direction of the solar panel 110 and outputs the feedback signal 132 accordingly for adjusting the orientation 112 of the solar panel 110 to point to the sun 101, namely, to orient the solar panel 110 directly towards the sun 101.

The connections and operations of various elements in the solar tracking device 100 will be described in detail below.

In the present embodiment, the solar panel 110 has a plurality of solar cells 140, as shown in FIG. 1A. To be specific, the solar cells 140 may be arranged as an array; however, the present invention is not limited to the arrangement illustrated in FIG. 1A, and the solar cells 140 may also be arranged into other patterns according to the actual requirement. In addition, the solar panel 110 may be implemented as a silicon photovoltaic (PV) module, a thin film PV module, an organic PV module, a dye sensitized PV module, or an III-V PV module according to the fabricating method and material of the solar cells 140. In the present embodiment, the solar panel 110 is implemented as a silicon PV module; however, the present invention is not limited thereto.

Figure 1B:
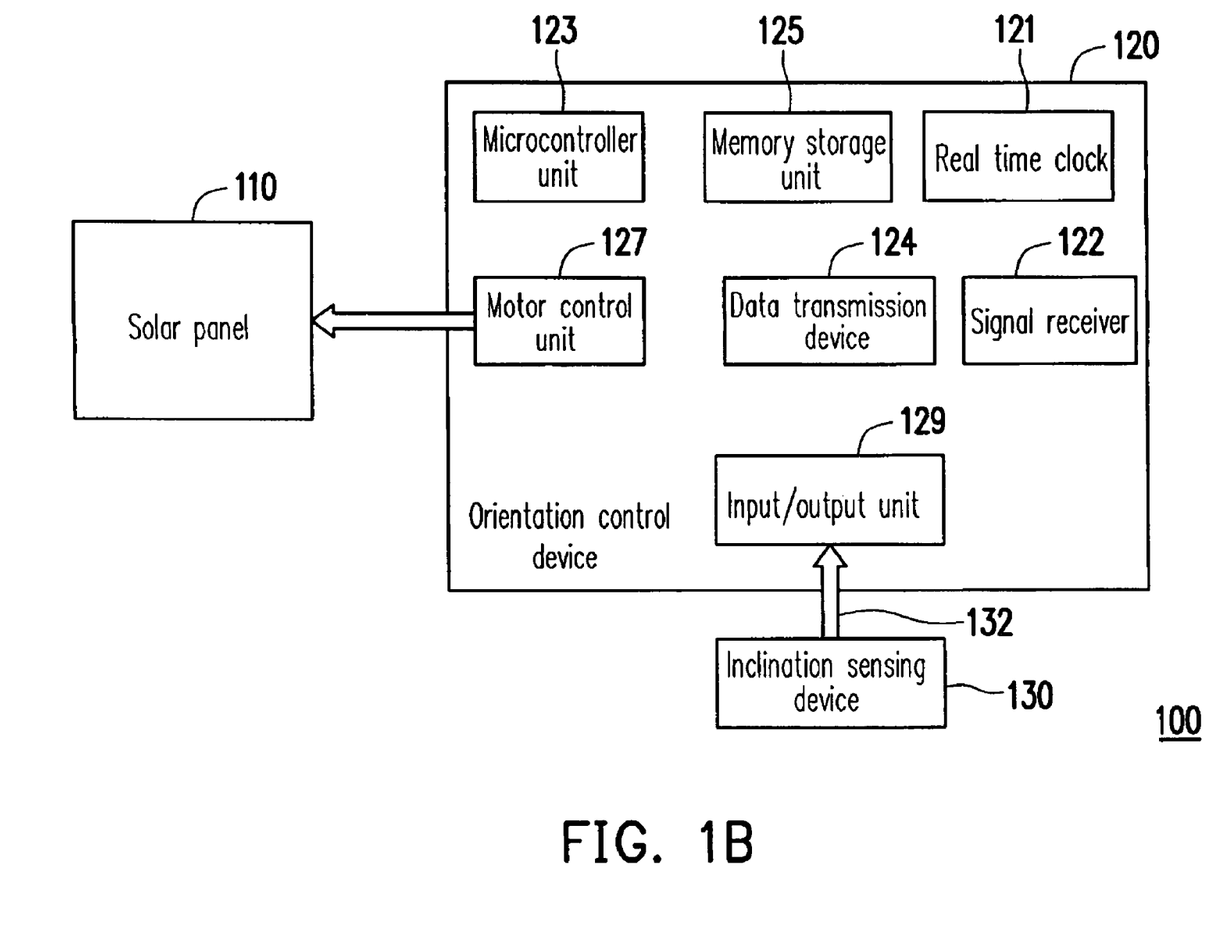
FIG. 1B is a system block diagram of the solar tracking device shown in FIG. 1A.

FIG. 1B is a system block diagram of the solar tracking device shown in FIG. 1A. Referring to both FIG. 1A and FIG. 1B, in the present embodiment, the orientation control device 120 includes a real time clock (RTC) 121, a microcontroller unit (MCU) 123, a memory storage unit 125, a motor control unit 127, and an input/output (I/O) unit 129. The RTC 121 is suitable for generating a time signal (the time signal can be transmitted to the MCU 123 or the memory storage unit 125) for the solar panel 110. The MCU 123 generates a control sequence signal according to a position signal (the position signal can be generated by the MCU 123 or an external position generator (not shown) and transmitted to the MCU 123) and the time signal of the solar panel 110, wherein the position signal includes one of a longitude signal, a latitude signal, and a altitude signal of the solar panel or a combination of foregoing signals.

In addition, the memory storage unit 125 stores the position signal, the time signal, and the control sequence signal. In an embodiment of the present invention, the MCU 123 transmits the control sequence signal to the motor control unit 127. The motor control unit 127 is suitable for receiving the control sequence signal to control the orientation 112 of the solar panel 110. The I/O unit 129 is suitable for transmitting the feedback signal 132 of the inclination sensing device 130 to the orientation control device 120 to adjust the orientation 112 of the solar panel 110.

As described above, in the present embodiment, the solar tracking device 100 determines the current position of the sun 101 according to its own position and time and accordingly orients the solar panel 110 towards the sun 101 directly. After that, the solar tracking device 100 determines whether the orientation 112 is correct according to the feedback signal 132 of the inclination sensing device 130 and adjusts the orientation 112 accordingly to allow the solar panel 110 to face the sun 101 correctly.

In an embodiment of the present invention, the orientation control device 120 further includes a data transmission device 124. The data transmission device 124 is suitable for loading the position signal into the orientation control device 120. Besides, the data transmission device 124 may be a serial port device or a parallel port device; however, the present invention is not limited thereto. In another embodiment of the present invention, the data transmission device 124 may also be a serial port device with wireless data transmission, such as a bluetooth plug-and-play device or an infrared plug-and-play device; however the present invention is not limited thereto.

In another embodiment of the present invention, the orientation control device 120 may further include a signal receiver 122. The signal receiver 122 corrects or fine tunes the time signal of the RTC 121. To be specific, the signal receiver 122 may be a FM receiver, a global positioning system (GPS) receiver, or other suitable receiver for receiving an external FM signal or a GPS signal and accordingly adjusting or correcting the time signal of the RTC 121. However, the present invention is not limited thereto. In other words, the signal receiver 122 may also be another suitable type of receiver for receiving another type of signal and accordingly adjusting or correcting the time signal.

In the present embodiment, in order to allow the solar tracking device 100 to track the sun more accurately so as to improve the photoelectric conversion efficiency of the solar panel and to prevent the solar tracking device 100 from being affected by environmental interruptions (for example, wind or vibrations) and accordingly producing error to the orientation 112 of the solar panel 110, an inclination sensing device 130 is disposed on the solar panel 110 for detecting an inclination direction of the solar panel 110 at all the time and outputting the feedback signal 132 to the orientation control device 120 according to the inclination direction, so as to determine whether the orientation 112 of the solar panel controlled by the orientation control device 120 is correct and adjust the orientation 112 accordingly.

Figure 1C:
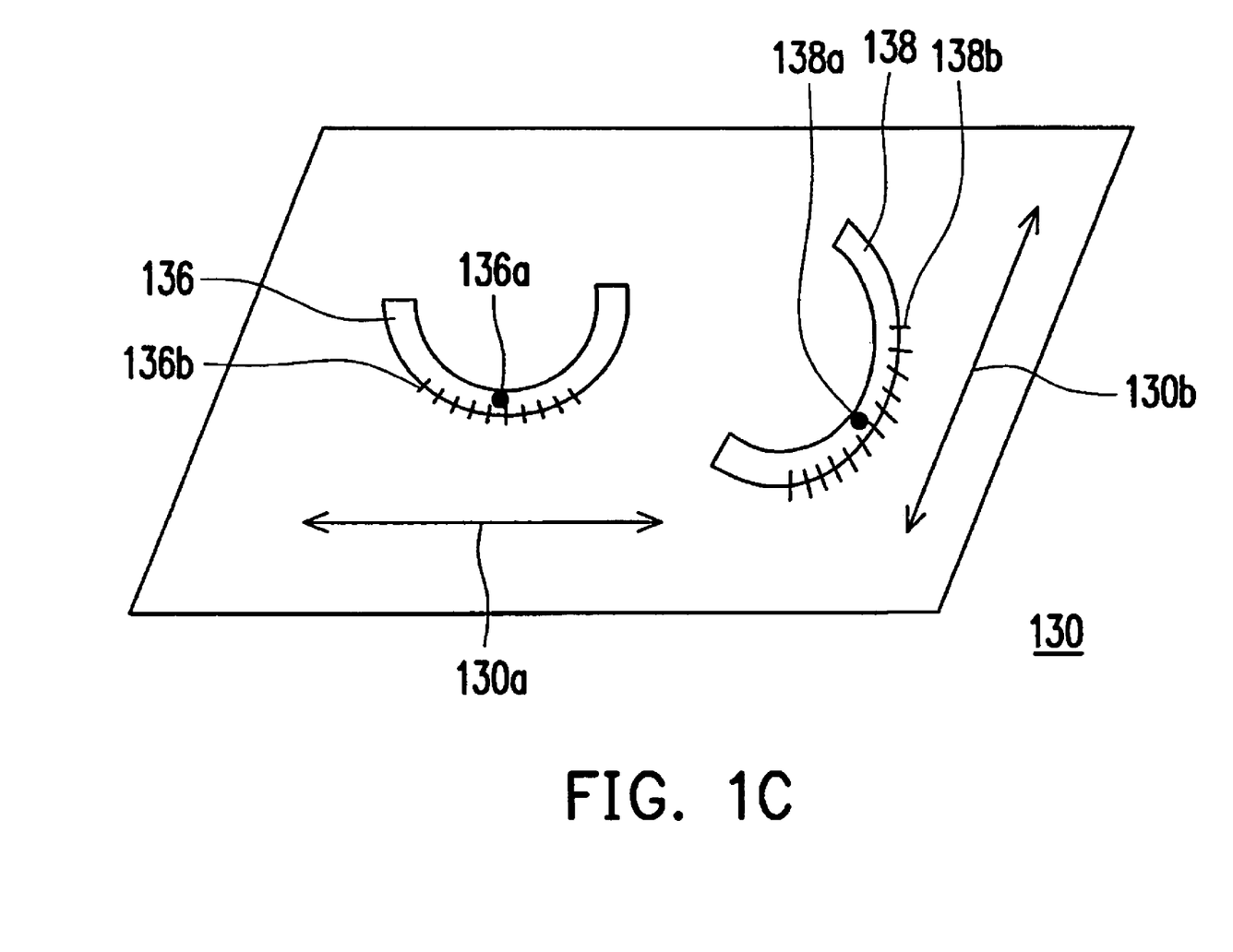
FIG. 1C is a diagram of an inclination sensing device drawn in FIG. 1A.
Figure 1D:
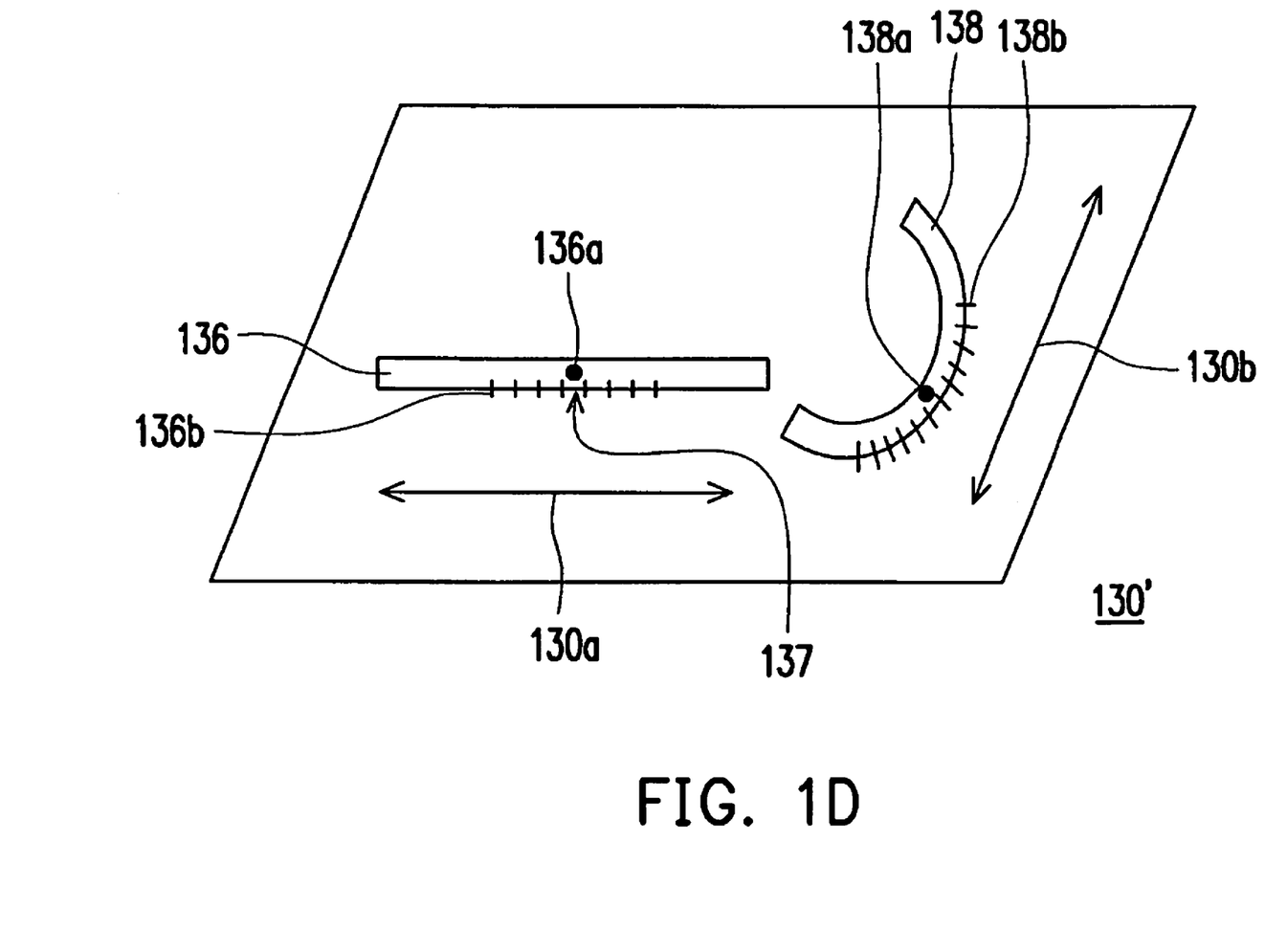
FIG. 1D is a diagram of another inclination sensing device drawn in FIG. 1A.

FIG. 1C is a diagram of an inclination sensing device applied in FIG. 1A, and FIG. 1D is a diagram of another type of inclination sensing device applied in FIG. 1A. Referring to FIG. 1C first, in the present embodiment, the inclination sensing device 130 includes a first containing area 136 extended along a first direction 130a and a first moving element 136a disposed within the first containing area 136. The first moving element 136a moves along the first direction 130a. A plurality of first sensing elements 136b are disposed within the first containing area 136. The first sensing elements 136b sense a first moving position of the first moving element 136a. In the present embodiment, the first containing area 136 has an arc design, and the first sensing elements 136b are evenly disposed within the first containing area 136, as shown in FIG. 1C. However, foregoing inclination sensing device is only described as an example, and it should be understood by those skilled in the art that other types of inclination sensing devices (for example, a G-sensor) may also be applied in the present invention.

To be specific, when the solar panel 110 inclines along the first direction 130a, the first moving element 136a moves within the first containing area 136 due to the gravity. In this case, the first sensing elements 136b sense a first moving position of the first moving element 136a and then obtain a first inclination angle of the solar panel 110 along the first direction 130a. In the present embodiment, the first direction 130a may be a direction from east to west or a direction from west to east.

Additionally, the inclination sensing device 130 further includes a second containing area 138 extended along a second direction 130b and a second moving element 138a disposed within the second containing area 138. The second moving element 138a moves along the second direction 130b. A plurality of second sensing elements 138b are disposed within the second containing area 138. The second sensing elements 138b sense a second moving position of the second moving element 138a. In the present embodiment, the second containing area 138 has an arc design, and the second sensing elements 138b are evenly disposed within the second containing area 138, as shown in FIG. 1C.

To be specific, when the solar panel 110 inclines along the second direction 130b, the second moving element 138a moves within the second containing area 138 due to the gravity, and the second sensing elements 138*b* are suitable for sensing a second moving position of the second moving element 138*a* and accordingly obtaining a second inclination angle of the solar panel 110 along the second direction 130*b*. In the present embodiment, the second direction 130*b* may be a direction from south to north or a direction from north to south.

As described above, the inclination sensing device 130 obtains the inclination direction of the solar panel 110 according to the first inclination angle and/or the second inclination angle and outputs the feedback signal 132 to the orientation control device 120 so that the orientation control device 120 can determine whether the orientation 112 of the solar panel 110 is correctly pointed to the sun 101 and then correct the orientation 112 of the solar panel 110 accordingly.

In another embodiment of the present invention, the first containing area 136 of the inclination sensing device 130' may have a linear design, as shown in FIG. 1D. In the present embodiment, the inclination sensing device 130' may detect whether the solar panel 110 moves along the first direction 130*a* only at noon. Namely, the orientation control device 120 controls the orientation 112 of the solar panel 110 correctly at noon when the first moving element 136*a* stays at a central position 137 of the first containing area 136. Contrarily, the orientation 112 of the solar panel 110 has to be adjusted to allow the first moving element 136*a* to stay at the central position of the first containing area 136.

As described above, with different types of inclination sensing devices 130 and 130', the solar tracking device 100 can correct the orientation of the solar panel constantly or only at noon. Thus, the solar tracking device 100 has a simple tracking mechanism. In addition, since the solar tracking device 100 can orient the solar panel correctly without adopting any photo sensor, the fabricating cost of the solar tracking device can be greatly reduced.

Figure 2:
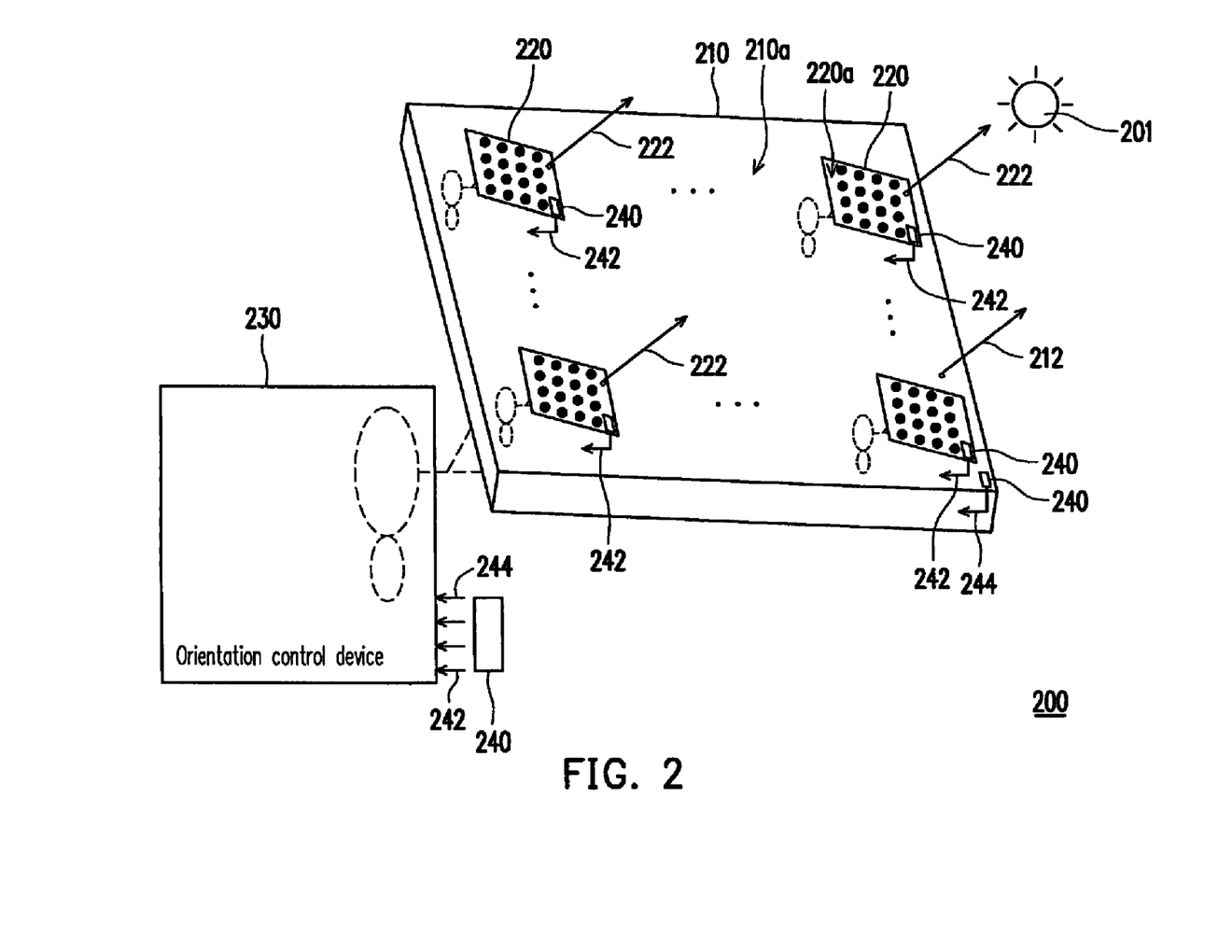
FIG. 2 is a diagram of a solar tracking device according to another embodiment of the present invention.

FIG. 2 is a diagram of a solar tracking device according to another embodiment of the present invention. Referring to FIG. 2, the solar tracking device 200 includes a casing 210, a plurality of solar panels 220, an orientation control device 230, and a plurality of inclination sensing devices 240. The solar panels 220 are disposed in the casing 210 and are suitable for converting optical energy into electric energy. The orientation control device 230 respectively controls a first orientation 222 of each of the solar panels 220 according to the position and time of the solar panel 220, wherein the first orientation 222 is defined as the normal vector of a light receiving surface 220*a* of the solar panels 220 which faces the sun 201. Each of the inclination sensing devices 240 is disposed on each of the solar panels 220 for sensing a first inclination direction of the solar panel 220, wherein the first inclination direction is defined as the normal vector of the light receiving surface 220*a* of the solar panel. Each of the inclination sensing devices 240 is suitable for outputting a first feedback signal 242 to the orientation control device 230 to correct the first orientation 222 of each of the solar panels 220 respectively.

In the present embodiment, the orientation control device 230 has a similar control mechanism as the orientation control device 120 are described above, and the difference between the two is that the orientation control device 230 further controls a second orientation 212 of the casing 210 according to the position and time of the solar panels 220, wherein the second orientation 212 is defined as the normal vector of a light receiving surface 210*a* of the casing 210. In addition, one of the inclination sensing devices 240 is disposed on the casing 210 for detecting a second inclination direction of the casing 210. The second inclination direction is the same as the second orientation 212 when the orientation control device 230 orients the solar panels 220 towards the sun 201 correctly. In addition, the inclination sensing devices 240 are suitable for outputting a second feedback signal 244 to the orientation control device 230 to correct the second orientation 212 of the casing 210.

Besides respectively controlling the first orientation 222 of each of the solar panels 220, the orientation control device 230 may also control the second orientation 212 of the casing 210 to orient the casing 210 towards the sun 201. To be specific, the orientation control device 230 can be implemented differently to allow the solar panels 220 to face the sun 201 constantly. For example, the first orientation 222 of the solar panels 220 is fixed so that the orientation control device 230 only controls the second orientation 212 of the casing 210; the second orientation 212 of the casing 210 is fixed so that the orientation control device 230 only controls the first orientation 222 of each of the solar panels 220; or, a combination of foregoing two situations may be implemented. However, the present invention is not limited thereto.

Since a plurality of solar panels 220 are disposed in the casing 210, in an embodiment of the present invention, the orientation control device 230 may control the second orientation 212 of the casing 210 to be only meridional and the first orientation 222 of each of the solar panels 220 to be transmeridional. In other words, the orientation control device 230 only controls the casing 210 to move meridionally in correspondence with different positions of the sun during different seasons, and at the same time, the orientation control device 230 controls each of the solar panels 220 to move transmeridionally in correspondence with the daily movement of the sun.

Similarly, in order to prevent the solar tracking device 200 from being affected by environmental interruptions and accordingly producing error to the orientation of the solar panel, the inclination sensing devices 240 are disposed on the solar panels 220 and the casing 210 for correcting the first orientation 222 of the solar panels 220 and the second orientation 212 of the casing 210 at all the time. However, in another embodiment of the present invention, only one inclination sensing device 240 may be disposed on one of the solar panels.

It should be mentioned that in the present embodiment, the inclination sensing devices 240 may be the inclination sensing devices 130 and 130' or a combination thereof. In addition, how the inclination sensing devices 240 correct the first orientation 222 of the solar panels 220 and the second orientation 212 of the casing 210 has been described above therefore will not be described herein.

Figure 3:
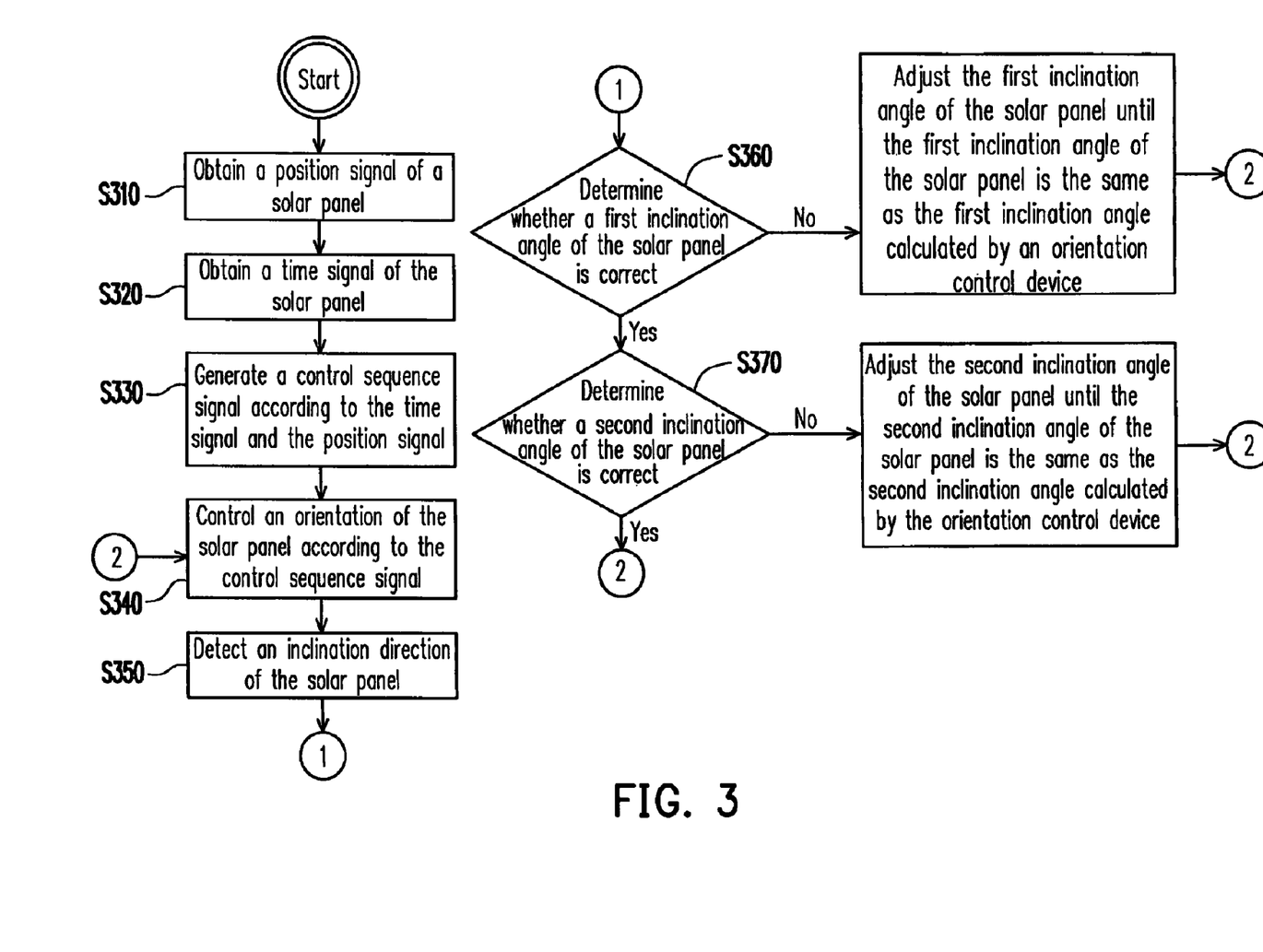
FIG. 3 is a flowchart of a solar tracking method according to an embodiment of the present invention.

FIG. 3 is a flowchart of a solar tracking method according to an embodiment of the present invention. Referring to FIG. 3, the solar tracking method in the present embodiment is suitable for controlling the orientation of the solar panels 110 and 220 to face the sun. First, in steps S310 and S320, a position signal and a time signal are obtained for a solar panel.

In the present embodiment, the position signal may be generated through a data transmission device which is suitable for transmitting the position signal, wherein the position signal includes one of a longitude signal, a latitude signal, and an altitude signal or a combination thereof. In addition, the data transmission device may be a serial port device or a parallel port device. Moreover, the time signal of the solar panel may be generated by a RTC.

Then, in step S330, a control sequence signal is generated according to the time signal and the position signal. In the present embodiment, the control sequence signal may be generated by a MCU. The MCU calculates the moving track of the sun according to the time signal and the position signal of the solar panel and then generates the control sequence signal to orient the solar panel towards the sun.

Next, in step S340, the orientation of the solar panel is controlled according to the control sequence signal. In the present embodiment, the solar panel may be controlled by using a motor control unit, wherein the motor control unit is suitable for receiving the control sequence signal to adjust the orientation of the solar panel at all the time.

After that, in step S350, an inclination direction of the solar panel is detected. In the present embodiment, the inclination direction of the solar panel may be detected by using an inclination sensing device disposed on the solar panel. The inclination sensing device detects a first inclination angle of the solar panel along a first direction, wherein how the inclination sensing device detects the inclination of the solar panel has been described above therefore will not be described herein. In addition, the first direction is a direction from east to west or a direction from west to east.

Besides, the inclination sensing device may also detects a second inclination angle of the solar panel along a second direction, wherein the second direction may be a direction from south to north or a direction from north to south.

Finally, in steps S360-S370, a feedback signal is output according to the inclination direction (the inclination direction may be the first inclination angle and/or the second inclination angle) to adjust the orientation of the solar panel. To be specific, the method for adjusting the orientation of the solar panel may include following steps. First, the first inclination angle of the solar panel is detected by using the inclination sensing device. Then, a feedback signal is sent to the orientation control device to determine whether the first inclination angle of the solar panel is correct. If the first inclination angle of the solar panel is incorrect, the orientation control device adjusts the first inclination angle of the solar panel constantly until the first inclination angle of the solar panel is the same as the first inclination angle calculated by the orientation control device. If the first inclination angle of the solar panel is correct, the inclination sensing device further detects the second inclination angle of the solar panel and sends another feedback signal to the orientation control device to determine whether the second inclination angle of the solar panel is correct. Similarly, if the second inclination angle of the solar panel is incorrect, the orientation control device adjusts the second inclination angle of the solar panel constantly until the second inclination angle of the solar panel is the same as the second inclination angle calculated by the orientation control device. By now, the correction function of the inclination sensing device is completed.

In overview, in the solar tracking device provided by the present invention, the current position of the sun is calculated according to the current position and time of the solar panel, and the orientation of the solar panel is directly oriented towards the sun by using an orientation control device. In addition, to prevent the solar tracking device from being affected by environmental interruptions and accordingly losing its accuracy, an inclination sensing device is further disposed on the solar panel as a feedback mechanism, and the inclination sensing device constantly detects whether the solar panel is oriented towards the sun correctly. Moreover, since the inclination sensing device detects the inclination direction of the solar panel based on a simple gravity theory without using any photo sensor, the solar tracking device in the present invention offers a simple tracking mechanism, low fabricating cost, and high photoelectric conversion efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A solar tracking device, comprising:
a solar panel, for converting solar energy into electric energy;
an orientation control device, controlling an orientation of the solar panel according to a position and a time of the solar panel; and
an inclination sensing device, disposed on the solar panel for detecting an inclination direction of the solar panel, wherein the inclination sensing device is suitable for outputting a feedback signal to the orientation control device to adjust the orientation of the solar panel,
wherein the inclination sensing device comprises a first containing area extended along a first direction and a first moving element disposed within the first containing area, wherein a first sensing element is disposed within the first containing area, the first sensing element senses a first moving position of the first moving element to detect a first inclination angle of the solar panel along the first direction, and the first moving element moves along the first direction,
wherein the inclination sensing device further comprises a second containing area extended along a second direction and a second moving element disposed within the second containing area, wherein a plurality of second sensing elements are disposed within the second containing area, the second sensing elements sense a second moving position of the second moving element to detect a second inclination angle of the solar panel along the second direction, and the second moving element moves along the second direction.

2. The solar tracking device according to claim 1, wherein a plurality of first sensing elements are disposed within the first containing area.

3. The solar tracking device according to claim 1, wherein the inclination sensing device outputs the feedback signal to the orientation control device according to the first inclination angle and/or the second inclination angle to adjust the first orientation of the solar panel.

4. The solar tracking device according to claim 1, wherein the first direction is a direction from east to west or a direction from west to east.

5. The solar tracking device according to claim 1, wherein the second direction is a direction from south to north or a direction from north to south.

6. The solar tracking device according to claim 1, wherein the orientation control device comprises:
a real time clock, generating a time signal for the solar panel;
a microcontroller unit, generating a control sequence signal according to a position signal and the time signal of the solar panel;
a memory storage unit, storing the position signal, the time signal, and the control sequence signal;
a motor control unit, receiving the control sequence signal to control the orientation of the solar panel; and
an input/output (I/O) unit, transmitting the feedback signal of the inclination sensing device to the orientation control device to adjust the orientation of the solar panel.

7. The solar tracking device according to claim 6, wherein the position signal comprises one of a longitude signal, a latitude signal, and an altitude signal or a combination of the longitude signal, the latitude signal, and the altitude signal.

8. The solar tracking device according to claim 6, wherein the orientation control device further comprises a data transmission device suitable for loading the position signal into the orientation control device.

9. The solar tracking device according to claim 8, wherein the data transmission device is a serial port device or a parallel port device.

10. The solar tracking device according to claim 6, wherein the orientation control device further comprises a signal receiver for correcting or fine tuning the time signal of the real time clock.

11. A solar tracking device, comprising:
a casing;
a plurality of solar panels, disposed in the casing, for converting solar energy into electric energy;
an orientation control device, controlling a first orientation of each of the solar panels according to a position and a time of the solar panel; and
a plurality of inclination sensing devices, respectively disposed on the solar panels for respectively detecting a first inclination direction of each of the solar panels, wherein each of the inclination sensing devices is suitable for outputting a first feedback signal to the orientation control device to respectively adjust the first orientation of each of the solar panels,
wherein the orientation control device further controls a second orientation of the casing according to the position and the time of the solar panel.

12. The solar tracking device according to claim 11, wherein one of the inclination sensing devices is further disposed on the casing for detecting a second inclination direction of the casing, wherein the inclination sensing device is suitable for outputting a second feedback signal to the orientation control device to adjust the second orientation of the casing.

13. The solar tracking device according to claim 12, wherein each of the inclination sensing devices further comprises a second containing area extended along a second direction and a second moving element disposed within the second containing area, wherein a plurality of second sensing elements are disposed within the second containing area, the second sensing elements sense a second moving position of the second moving element to detect a second inclination angle of each of the solar panels along the second direction, and the second moving element moves along the second direction.

14. The solar tracking device according to claim 13, wherein each of the inclination sensing devices outputs the first feedback signal to the orientation control device according to the first inclination angle and/or the second inclination angle to adjust the first orientation of each of the solar panels.

15. The solar tracking device according to claim 13, wherein the second direction is a direction from south to north or a direction from north to south.

16. The solar tracking device according to claim 11, wherein each of the inclination sensing devices comprises a first containing area extended along a first direction and a first moving element disposed within the first containing area, wherein a first sensing element is disposed within the first containing area, the first sensing element senses a first moving position of the first moving element to detect a first inclination angle of each of the solar panels along the first direction, and the first moving element moves along the first direction.

17. The solar tracking device according to claim 16, wherein the first direction is a direction from east to west or a direction from west to east.

18. The solar tracking device according to claim 11, wherein the orientation control device comprises:
a real time clock, generating a time signal for the solar panels;
a microcontroller unit, generating a control sequence signal according to a position signal and the time signal of the solar panels;
a memory storage unit, storing the position signal, the time signal, and the control sequence signal;
a motor control unit, receiving the control sequence signal to respectively control the first orientation of each of the solar panels; and
an I/O unit, transmitting the first feedback signal of each of the inclination sensing devices to the orientation control device to adjust the first orientation of each of the solar panels.

19. The solar tracking device according to claim 18, wherein the position signal comprises one of a longitude signal, a latitude signal, and an altitude signal or a combination of the longitude signal, the latitude signal, and the altitude signal.

20. The solar tracking device according to claim 18, wherein the orientation control device further comprises a data transmission device suitable for loading the position signal into the orientation control device.

21. The solar tracking device according to claim 20, wherein the data transmission device is a serial port device or a parallel port device.

22. The solar tracking device according to claim 18, wherein the orientation control device further comprises a signal receiver for correcting or fine tuning the time signal of the real time clock.

* * * * *